United States Patent
Liao et al.

(10) Patent No.: US 8,119,230 B2
(45) Date of Patent: Feb. 21, 2012

(54) TRANSPARENT FILM WITH UV-SHIELDING AND WATER/OIL REPELLENT FUNCTIONS

(75) Inventors: Shih-Chieh Liao, Hsinchu (TW);
Chien-Te Hsieh, Hsinchu (TW);
Jin-Ming Chen, Hsinchu (TW);
Jung-Jung Kuo, Hsinchu (TW);
Chia-Hao Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 259 days.

(21) Appl. No.: 11/444,411

(22) Filed: Jun. 1, 2006

(65) Prior Publication Data
US 2007/0134469 A1    Jun. 14, 2007

(30) Foreign Application Priority Data

Dec. 9, 2005    (TW) ............................... 94143661 A

(51) Int. Cl.
*B32B 5/16*    (2006.01)
(52) U.S. Cl. ...................................... 428/323
(58) Field of Classification Search .................. 428/323
See application file for complete search history.

(56) References Cited

U.S. PATENT DOCUMENTS 5,693,236  A        12/1997  Okumura et al.
6,200,680  B1 *    3/2001   Takeda et al. ............... 428/402
2004/0241189 A1 * 12/2004  Ishii et al. ................... 424/200.1
2005/0249660 A1 * 11/2005  Liao et al. ..................... 423/622
2007/0166531 A1 *  7/2007  Ohnishi et al. ............... 428/323

FOREIGN PATENT DOCUMENTS

| CN | 1553939 | 12/2004 |
| TW | I233321 | 5/2005 |
| TW | 200528186 | 9/2005 |
| WO | WO 03104319 A1 * | 12/2003 |
| WO | WO 2005044926 A1 * | 5/2005 |

OTHER PUBLICATIONS

Xu et al., Tetrapod-like nano-particle ZnO/acrylic resin composite and its multi-function property, Progress in Organic Coatings 46 (2003) 297-301.*
Pana Tetra product literature downloaded from http://industrial.panasonic.com/www-data/pdf/FAA3000/FAA3000CE1.pdf and http://industrial.panasonic.com/ww/i_e/29865/amtec_e/amtec_e/panatetra1_e.html on Oct. 20, 2010.*
Hsiu-Fen Lin et al., "The dc thermal plasma synthesis of ZnO nanoparticles for visible-light photocatalyst", Journal of photochemistry and Photobiology A: Chemistry 174, 2005, pp. 82-87.
Chien-Te Hsieh et al., "Influence of surface roughness on water- and oil-repellent surfaces coated with nanoparticles", Applied Surface Science, 2004, pp. 1-9, Elsevier B.V.

* cited by examiner

*Primary Examiner* — Callie Shosho
*Assistant Examiner* — Elizabeth A Robinson
(74) *Attorney, Agent, or Firm* — Rabin & Berdo, P.C.

(57) ABSTRACT

A transparent film, which has a rugged surface with tiny cilia, is prepared by the tetrapod-shaped ZnO (zinc oxide) nanopowders coated with polymers including $CF_x$- and/or $CH_x$- functional group(s). This transparent film possesses UV-shielding and water/oil repellent functions, which can be applied to textiles, glass, woods, ceramics, tiles, plastics, and metals.

16 Claims, 4 Drawing Sheets

TRANSPARENT FILM WITH UV-SHIELDING AND WATER/OIL REPELLENT FUNCTIONS

CROSS-REFERENCE TO RELATED APPLICATIONS

This non-provisional application claims priority under 35 U.S.C. §119(a) on Patent Application No(s). 094143661 filed in Taiwan, R.O.C. on Dec. 9, 2005, the entire contents of which are hereby incorporated by reference.

BACKGROUND

1. Field of Invention

The invention is a film, which has a rugged surface with tiny cilia, prepared by tetrapod-shaped zinc oxide nanopowders coated with a polymer including $CF_x$ and/or $CH_x$ functional groups. This transparent film possesses UV-shielding and water/oil repellent functions.

2. Related Art

Superhydrophobicity is exhibited by the unique microstructure and chemical properties of the leaves of certain plants in the nature. The characteristic of a superhydrophobic surface is that water forms spherical droplets immediately when dropping on the surface. Such a superhydrophobic surface possesses so-called "self-cleaning" function. For example, droplets formed on a lotus leaf carry the dust away by their rolling. This superhydrophobic phenomenon is caused by the roughness and low surface tension of the surface.

When a liquid drops on a surface of an object, an angle is then formed between the surface and the tangent line of the drop, called contact angel θ. When the tension in the gas-solid interface (also called solid surface energy) is high, the contact angle tends to be low, which means the surface easily gets wet. Contact angle of 0 degree indicates that water spreads over and becomes a film on the surface so that the surface would completely get wet. On the contrary, if the tension in the gas-solid interface is low, the contact angle tends to be high, indicating that the surface does not easily get wet. Therefore, contact angel of 180 degrees means that the liquid forms spherical droplets and cannot wet the surface at all.

When the surface with low surface energy is rougher, the contact angle would normally become higher. This is because the surface cavities with high aspect ratio may trap air so that the drop sits on a composite surface made of air and solid.

Presently, there are many methods for preparing a water-repellent surface. For example, U.S. Pat. No. 5,693,236 provides a water-repellent structure and its fabrication method including the steps of: preparing a mixture by mixing a curable liquid with a needle-like material; applying the mixture onto a surface of an object; curing a liquid of the applied mixture and forming an applied layer in which the needle-like material has been mixed on a base material of the cured liquid of the mixture; forming pits and projections of the needle-like material on a surface of the applied layer by etching the applied layer under a condition where an etching rate of the base material is larger than that of the needle-like material; and coating the surface of the applied layer with a water-repellent substance. The purpose of this invention is to provide a nanocoating material that is transparent and possesses superhydrophic and UV blocking properties.

SUMMARY OF THE INVENTION

A transparent film, which has a rugged surface with tiny cilia, is prepared by the tetrapod-shaped zinc oxide nanopowders coated with a polymer containing $CF_x$ and/or $CH_x$ functional groups. This transparent film possesses UV shielding and water/oil repellent functions, which can be applied to textiles, glass, woods, ceramics, tiles, plastics and metals.

In the first embodiment of the present invention, the transparent film has UV shielding and water/oil repellent functions, including tetrapod-shaped zinc oxide nanopowders and a polymer containing $CF_x$ and/or $CH_x$ functional groups. The polymer is used to treat the surface of zinc oxide nanopowders so as to form a surface coating.

On the other hand, in the second embodiment of the present invention, the transparent film has UV shielding and water/oil repellent functions, including tetrapod-shaped zinc oxide nanopowders, a transparent barrier layer, and a polymer film. The transparent barrier layer is made by coating a material such as silicon oxide ($SiO_2$) on the surface of the zinc oxide nanopowders. Furthermore, the transparent barrier layer is surface-treated by a polymer containing $CF_x$ and/or $CH_x$ functional groups.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below, which is for illustration only and thus is not limitative of the present invention, wherein.

DETAILED DESCRIPTION

A transparent film of the present invention, which has a rugged surface with tiny cilia, is made of tetrapod-shaped zinc oxide nanopowders 10 treated by a polymer containing $CF_x$ and/or $CH_x$ functional groups. This transparent film provides UV shielding and water/oil repellent functions.

Furthermore, tetrapod-shaped zinc oxide nanopowders 10 with a HCP Wurtzite structure are made by using a non-consumable electrode type of direct current plasma to vaporize solid zinc metal under the controlled pressure and atmosphere including nitrogen. Then the vaporized metal particle is oxidized through a homogeneous nucleation mechanism with a large amount of mixture of oxygen and nitrogen. The resulting ZnO nanoparticles are further quenched by a large amount of cooling air to prevent the particles from agglomeration. Details of the process have been shown in Taiwan patent No. 1233321 and its corresponding U.S. Pat. No. 7,125,537, and Taiwan patent No. 1246939.

Figure 1A:
FIG. 1A is a transmission electron microscope photo showing a tetrapod-shaped zinc oxide nanoparticle.
Figure 1B:
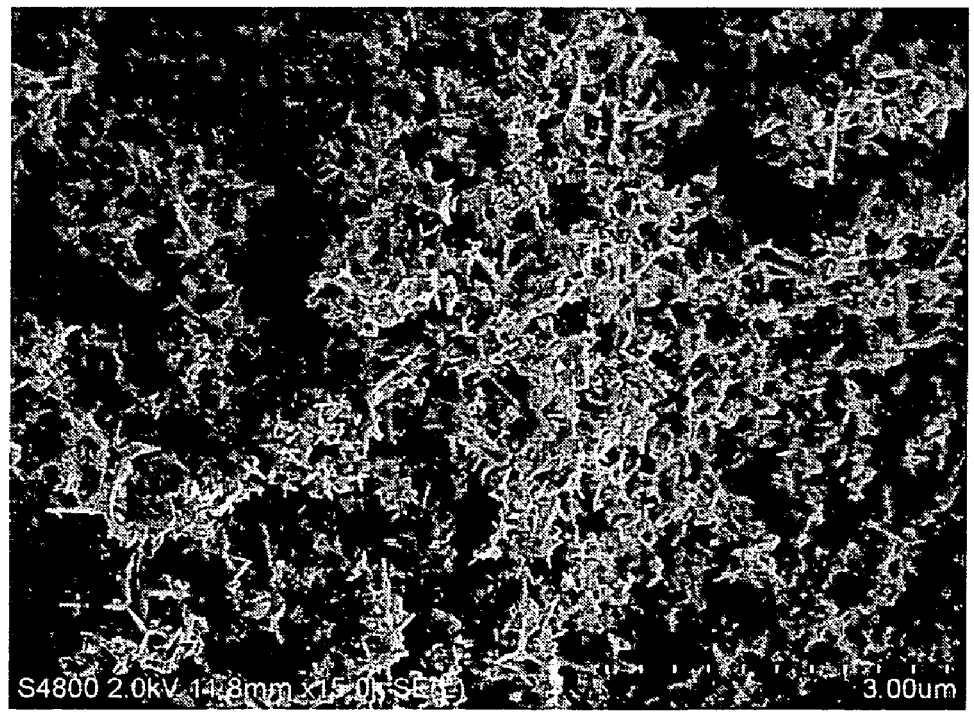
FIG. 1B is a field emission scanning electron microscope picture showing coating made of tetrapod-shaped zinc oxide nanopowders

A tetrapod-shaped zinc oxide nanoparticle 10 consists of four crystalline rods with hexagonal cross sections. As shown in FIG. 1A, each zinc oxide rod 10 has a diameter between 10 nm and 100 nm, and a length between 50 nm and 1000 nm. FIG. 1B is a field emission scanning electron microscope picture showing coating made of tetrapod-shaped zinc oxide nanopowders.

Next, a transparent film with UV shielding and water/oil repellent functions according to the invention will be described with respect to the figures.

Figure 2:
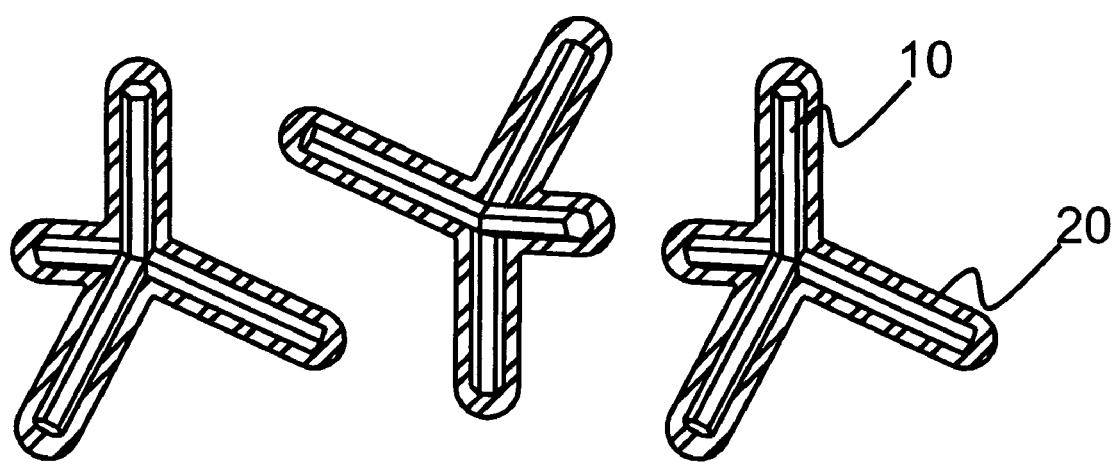
FIG. 2 shows the first embodiment according to the invention.

FIG. 2 shows the first embodiment of the transparent film. The transparent film includes tetrapod-shaped zinc oxide nanopowders 10 with a HCP Wurtzite structure, which is capable of absorbing and shielding the UV light, and a polymer film containing $CF_x$ and/or $CH_x$ functional groups 20 formed on the surface of the zinc oxide nanopowder 10. The transparent film has a rugged surface that provides UV shielding and water/oil repellent functions.

Figure 3:
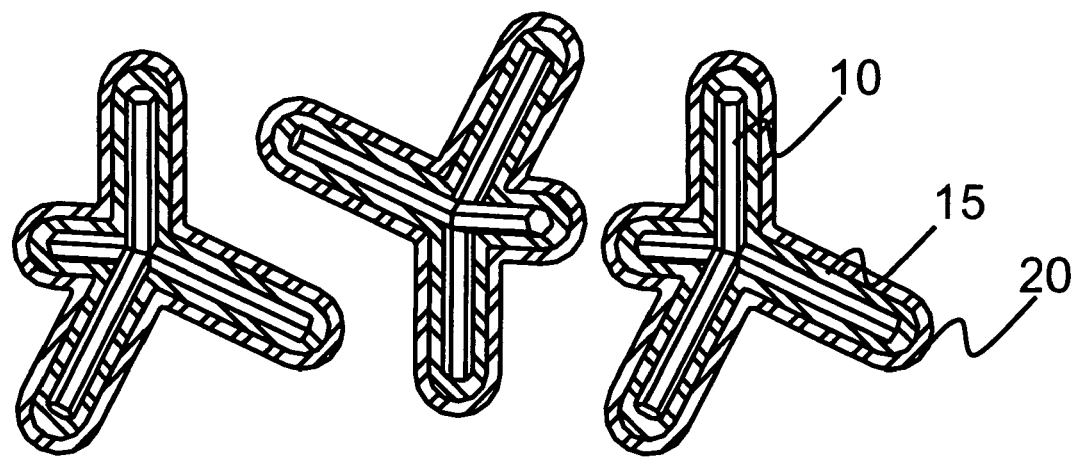
FIG. 3 shows the second embodiment according to the invention.

FIG. 3 shows the second embodiment of the transparent film. The transparent film includes: a zinc oxide nanopowder 10, a transparent barrier layer 15, and a polymer film 20. The tetrapod-shaped zinc oxide nanopowders with a HCP Wurtzite structure 10 are made by using the direct current plasma technique described above. Next, to avoid the photocatalytic effect, a transparent barrier material such as silicon oxide (SiO2) is coated on the zinc oxide powders 10 to form a transparent barrier layer 15 with a thickness between 1 nm and 20 nm so as to form core-shell ZnO—SiO2 nanopowders.

Then, an ionic surfactant with an amino group is used to treat the surface of the transparent barrier layer 15 that is also the surface of the ZnO—$SiO_2$ core-shell nanopowders for changing the state of surface charge of the ZnO—$SiO_2$ core-shell nanoparticles and for further improving the compatibility between the ZnO—$SiO_2$ core-shell nanopowders and the polymer.

However, the step of surface treatment by an ionic surfactant with an amino group may not be a necessary step, depending on the properties of the polymer used.

Finally, a polymer containing $CF_x$ and/or $CH_x$ functional groups is used to treat the surface of the transparent barrier layer 15, which has already been treated by the ionic surfactant with an amino group, to form a polymer film 20.

Figure 4:
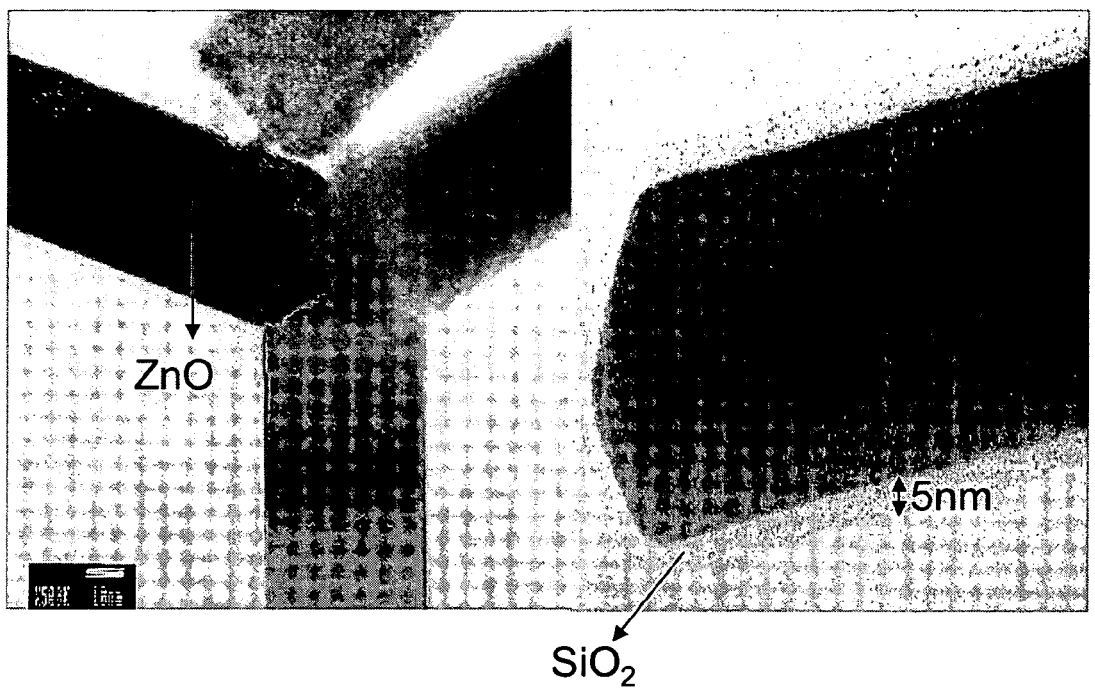
FIG. 4 is an electron microscopy photo showing the ZnO—$SiO_2$ core-shell nanoparticle according to the invention.
Figure 5:
FIG. 5 is a transmission electron microscopy photo showing the enlarged view of $SiO_2$ coating according to the invention.

FIG. 4 shows the field emission scanning electron micrograph (FESEM) of the ZnO—$SiO_2$ core-shell nanoparticle formed by coating a silicon oxide on the zinc oxide nanopowder 10. The $SiO_2$ layer has a thickness of 5 nm. FIG. 5 shows a transmission electron microscopy (TEM) photo of the enlarged view of $SiO_2$ coating according to the invention on a rod having a length of 260 nm.

According to the foregoing description, the present invention of the transparent film with the UV shielding and water/oil repellent functions can be achieved by using a polymer containing $CF_x$ and/or $CH_x$ functional groups to treat the surface of the tetrapod-shaped zinc oxide nanopowders 10. Alternatively, the transparent film mentioned above can be achieved by using a polymer containing $CF_x$ and/or $CH_x$ functional groups to treat the surface of the tetrapod-shaped zinc oxide nanopowders 10 coated with the transparent barrier layer 15.

Furthermore, the above-mentioned transparent coating made of the tetrapod-shaped zinc oxide nanopowders 10 has better water/oil repellent properties, compared with those of the coating made of the rod-shaped and spherical zinc oxide nanopowders. While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A transparent film having a rugged surface with tiny cilia of tetrapod-shaped zinc oxide for providing UV-shielding and water/oil repellency, the transparent film consisting essentially of:

zinc oxide powder comprising zinc oxide in powder form that has a tetrapod-shape and an HCP wurtzite structure, wherein the tetrapod-shaped zinc oxide powder has rods each of which has a diameter in the range 10 nm to 100 nm and a length in the range 50 nm to 260 nm;

a transparent barrier layer coated onto the surface of the zinc oxide powder; and a polymer film that is transparent and coated on the surface of the transparent barrier layer.

2. The transparent film as claimed in claim 1, wherein the transparent barrier layer is comprised of silicon oxide coated onto the surface of the zinc oxide powder to form a nanopowder having a ZnO core and a $SiO_2$ shell.

3. The transparent film as claimed in claim 2, wherein the $SiO_2$ shell has a thickness ranging from 1 nm to 20 nm.

4. The transparent film as claimed in claim 1, wherein the polymer film comprises a polymer containing a CFx group.

5. The transparent film as claimed in claim 1, wherein the polymer film comprises a polymer containing a CHx group.

6. The transparent film as claimed in claim 1, wherein the zinc oxide powder is a nanopowder.

7. A transparent film having a rugged surface with tiny cilia of tetrapod-shaped zinc oxide for providing UV-shielding and water/oil repellency, the transparent film consisting essentially of:

zinc oxide powder comprising zinc oxide in powder form that has a tetrapod-shape and an HCP wurtzite structure, wherein the tetrapod-shaped zinc oxide powder has rods each of which has a diameter in the range 10 nm to 100 nm and a length in the range 50 nm to 260 nm;

a transparent barrier layer coated onto the surface of the zinc oxide powder;

an ionic surfactant having an amino group applied to a surface of the transparent barrier layer; and a polymer film that is transparent and coated onto the surface of the transparent barrier layer after the ionic surfactant is applied thereto.

8. The transparent film as claimed in claim 7, wherein the transparent barrier layer is comprised of silicon oxide coated onto the surface of the zinc oxide powder to form a nanopowder having a ZnO core and a $SiO_2$ shell.

9. The transparent film as claimed in claim 8, wherein the $SiO_2$ shell has a thickness ranging from 1 nm to 20 nm.

10. The transparent film as claimed in claim 7, wherein the polymer film comprises a polymer containing a CFx group.

11. The transparent film as claimed in claim 7, wherein the polymer film comprises a polymer containing a CHx group.

12. The transparent film as claimed in claim 7, wherein the zinc oxide powder is a nanopowder.

13. A transparent film having a rugged surface with tiny cilia of tetrapod-shaped zinc oxide for providing UV-shielding and water/oil repellency, the transparent film comprising:

a nanopowder having a ZnO core and a transparent barrier layer shell, the ZnO core being comprised of zinc oxide in nanopowder form that has a tetrapod-shape and an HCP wurtzite structure, and the transparent barrier layer shell being comprised of silicon oxide that is coated onto the surface of the zinc oxide nanopowder, wherein the tetrapod-shaped zinc oxide powder has rods each of which has a diameter in the range 10 nm to 100 nm and a length in the range 50 nm to 260 nm; and a polymer film that is transparent, comprises a polymer, and coats the surface of the nanopowder to provide the transparent film.

14. The transparent film as claimed in claim 13, further comprising an ionic surfactant having an amino group applied to the surface of the nanopowder prior to coating the nanopowder with the polymer film.

15. The transparent film as claimed in claim 13, wherein the polymer comprises at least one of a CFx group and a CHx group.

16. The transparent film as claimed in claim 13, wherein transparent barrier layer shell has a thickness in the range 1 nm to 20 nm.

* * * * *